United States Patent
Shen

(10) Patent No.: US 7,724,929 B2
(45) Date of Patent: May 25, 2010

(54) SYSTEM AND METHOD FOR MYOCARDIUM SEGMENTATION IN REALTIME CARDIAC MR DATA

(75) Inventor: Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 898 days.

(21) Appl. No.: 11/539,667

(22) Filed: Oct. 9, 2006

(65) Prior Publication Data

US 2007/0116339 A1 May 24, 2007

Related U.S. Application Data

(60) Provisional application No. 60/727,370, filed on Oct. 17, 2005.

(51) Int. Cl.
*G06K 9/00* (2006.01)
*G06K 9/34* (2006.01)
*G06K 9/36* (2006.01)

(52) U.S. Cl. .......................... 382/128; 382/173; 382/281

(58) Field of Classification Search ......... 382/128–132, 382/173, 281; 600/407, 410
See application file for complete search history.

(56) References Cited

U.S. PATENT DOCUMENTS

| 2003/0069494 A1* | 4/2003 | Jolly ........................... 600/410 |
| 2005/0074154 A1* | 4/2005 | Georgescu et al. .......... 382/128 |
| 2005/0228254 A1* | 10/2005 | Torp et al. ................... 600/407 |
| 2006/0120583 A1* | 6/2006 | Dewaele ..................... 382/128 |

\* cited by examiner

*Primary Examiner*—Vu Le
*Assistant Examiner*—Amara Abdi

(57) ABSTRACT

A method for cardiac segmentation includes providing a plurality of digitized medical images, each image comprising a plurality of intensities corresponding to a domain of points on an 2-dimensional grid, the plurality of images forming a sequence of cardiac images acquired at different time points, filtering noise from the sequence of images, approximating the endocardium with a first circle, approximating the epicardium with a second circle, finding candidate points for the endocardium, finding candidate points for the epicardium, and interpolating gaps between points of the endocardium and between points of the epicardium wherein the myocardium is segmented.

12 Claims, 5 Drawing Sheets

Phases of segmentation

Segmentation results

SYSTEM AND METHOD FOR MYOCARDIUM SEGMENTATION IN REALTIME CARDIAC MR DATA

CROSS REFERENCE TO RELATED UNITED STATES APPLICATIONS

This application claims priority from: "A Fast Algorithm for the Segmentation of Myocardium in Realtime Cardiac MR Data", U.S. Provisional Application No. 60/727,370 of Hong Shen, filed Oct. 17, 2005, the contents of which are incorporated herein by reference.

TECHNICAL FIELD

This invention is directed to cardiac segmentation in digitized medical images.

DISCUSSION OF THE RELATED ART

Cardiac magnetic resonance ("MR") imaging has become a mainstream clinical instrument to assess congenital heart disease. It is a cutting-edge technology that is beginning to replace fluoroscopy as the modality of choice to guide minimally invasive interventions in the heart.

Although a physician can visually detect abnormalities of wall motions, mere interpretation of wall motion has well known limits. For instance, a human cannot identify transient changes in myocardial motion, even if real-time MR provides high frame rate data acquisition. Therefore, computer assisted quantitative analysis of regional wall motion is highly desired. This includes the automatic detection and recording of abnormal behavior in the motion of myocardial wall thickening and thinning. The velocity of myocardial motion should be recorded in real time.

The segmentation of the myocardium is the basis of quantitative analysis of myocardium motion. A myocardium segmentation algorithm should have close to real-time performance in order to support the detection of transient motions of the myocardium. However, real-time MR usually has low spatial resolution, thus reducing the amount of data to be processed. On the other hand, the image data is noisy and less accurate.

SUMMARY OF THE INVENTION

Exemplary embodiments of the invention as described herein generally include methods and systems for fast segmentation of the myocardium in the left ventricle in cardiac MR volume data. It is the basis of real-time monitoring of the myocardial activity in a cardiac operation.

According to an aspect of the invention, there is provided a method for cardiac segmentation, including the steps of providing a plurality of digitized medical images, each said image comprising a plurality of intensities corresponding to a domain of points on an 2-dimensional grid, said plurality of images comprising a sequence of cardiac images acquired at different time points, filtering noise from said sequence of images, approximating the endocardium with a first circle, approximating the epicardium with a second circle, finding candidate points for the endocardium, finding candidate points for the epicardium, and interpolating gaps between points of the endocardium and between points of the epicardium wherein the myocardium is segmented.

According to a further aspect of the invention, the method comprises using a Hough transform to approximate the endocardium, and using a Hough transform to approximate the epicardium.

According to a further aspect of the invention, finding candidate points for the endocardium comprises, for each image, extending a plurality of rays from a center of said first circle to points on said circle, selecting those points near said first circle that are edge points as candidate points, and grouping said candidate points using a connected component analysis.

According to a further aspect of the invention, a search range for finding candidate points in one of said sequence of images is limited to a region of endocardium candidate points in a preceding image of said sequence of images.

According to a further aspect of the invention, finding candidate points for the epicardium comprises, for each image, extending a plurality of rays from a center of said first circle to points on said circle, selecting those points near said first circle that are edge points in a left part of the epicardium as candidate points, and grouping said candidate points using a connected component analysis.

According to a further aspect of the invention, a search range for finding candidate points in one of said sequence of images is limited to a region of endocardium candidate points in the same image of said sequence of images, and epicardium candidate points in a preceding image of said sequence of images.

According to a further aspect of the invention, interpolating gaps between points of the endocardium and between points of the epicardium comprises using a polynomial spline functions to connect said gaps.

According to a further aspect of the invention, interpolating gaps between points of the endocardium comprises using a Bezier curve.

According to a further aspect of the invention, interpolating gaps between points of the epicardium comprises using a Bezier curve and a Ferguson curve.

According to another aspect of the invention, there is provided a program storage device readable by a computer, tangibly embodying a program of instructions executable by the computer to perform the method steps for cardiac segmentation.

DETAILED DESCRIPTION OF THE PREFERRED EMBODIMENTS

Figure 1:
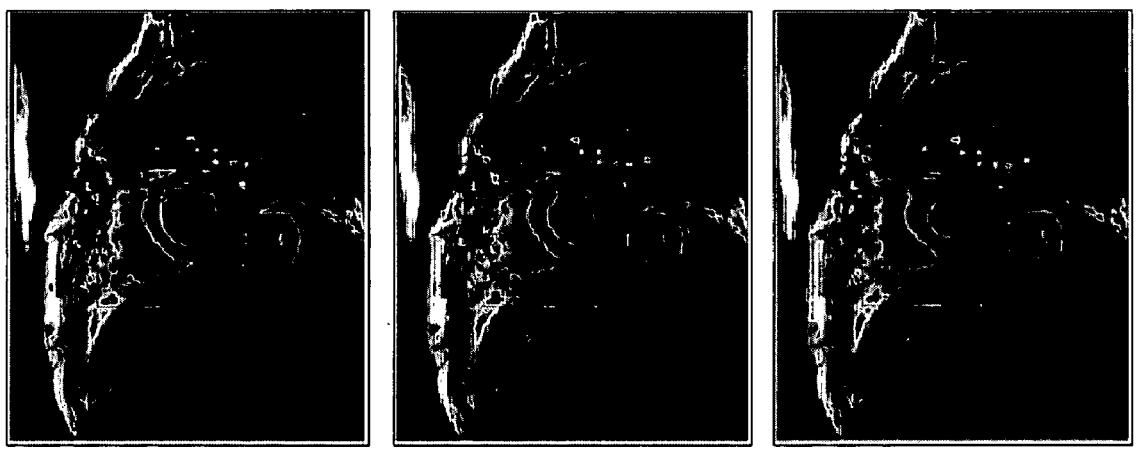
FIG. 1 illustrates three frames in a real-time cardiac MR sequence, according to an embodiment of the invention.

Exemplary embodiments of the invention as described herein generally include systems and methods for fast segmentation of the myocardium. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling, within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Although there has been much research and development regarding segmentation of the left ventricle from regular MR, the accuracy, robustness, and especially performance do not meet the need of analyzing real-time cardiac MR data. Simple but robust techniques are desired to handle the noisy and inaccurate data.

FIG. 1 illustrates three frames in a real-time cardiac MR sequence, according to an embodiment of the invention. These frames are taken from a sequence of 2-dimensional short-axis images of the left ventricle over time, as shown in the figure. The myocardium is the muscular tissue of the heart, which has a ring-like structure. The inner and outer layers of the myocardium are known as the endocardium and epicardium, respectively.

Figure 4:
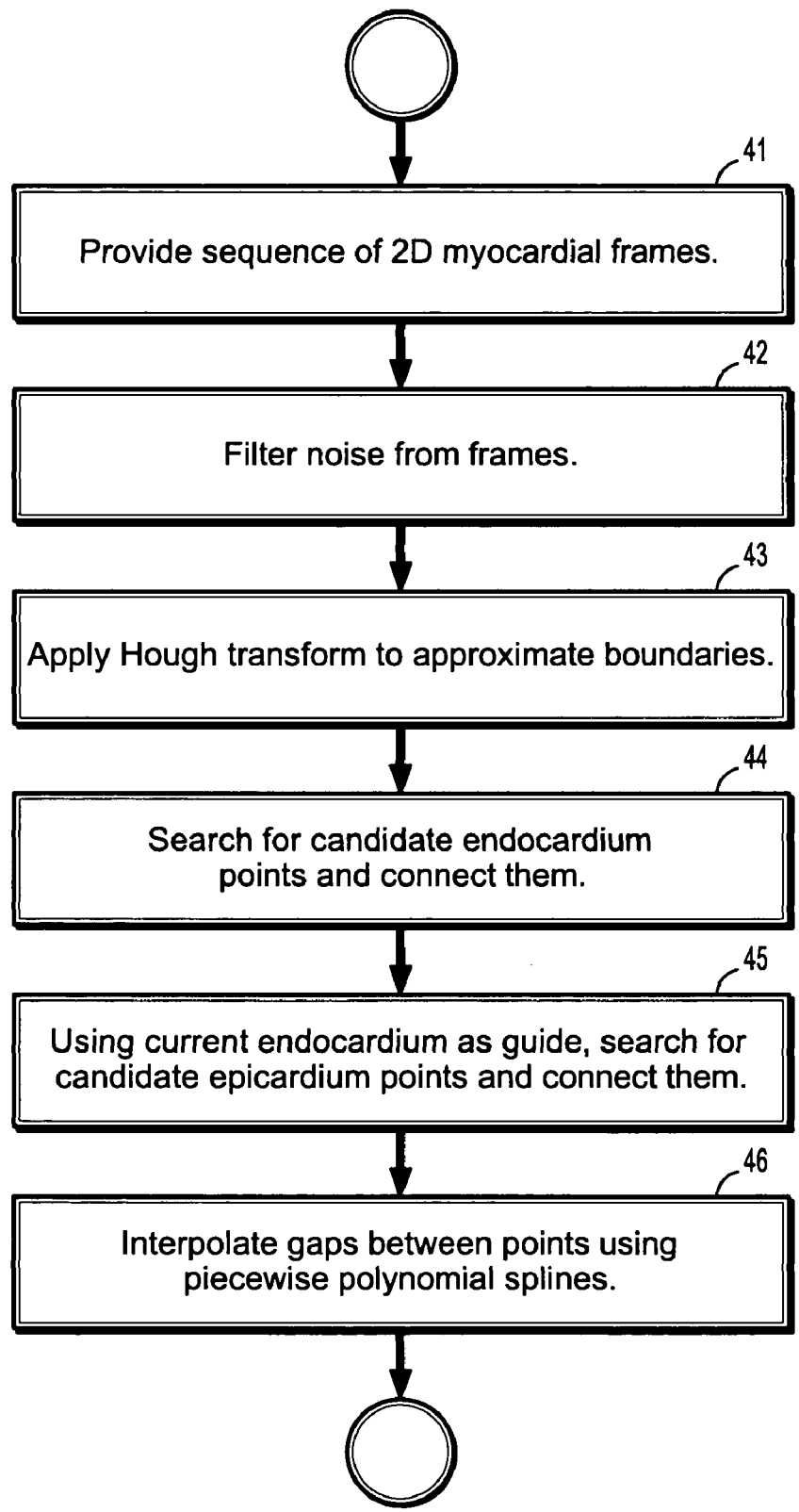
FIG. 4 is a flowchart of a myocardial segmentation method according to an embodiment of the invention.

A flowchart of a myocardial segmentation method according to an embodiment of the invention is depicted in FIG. 4. FIGS. 2(a)-(e) depict respective phases of a segmentation method according to an embodiment of the invention. Referring now to FIG. 4, a method begins at step 41 by providing input data, typically a sequence of 2D cardiac frames. In a typical sequence, the thickness of the myocardium wall changes periodically with the cardiac cycle. It is therefore natural to utilize the temporal and spatial correlations between frames. After the first frame, the segmentation of the previous frame can be used for the initialization of the current frame.

At step 42, each 2D frame is smoothed by a low-pass filter to reduce noise. Edge detection is also applied to obtain an edge response image. One exemplary, non-limiting edge detection technique is the Canny edge detector algorithm.

The endocardium and epicardium form the boundaries of the myocardium, and therefore it is desirable to detect them. Both have close to circular shapes, and therefore, at step 43, a Hough transform can be applied to obtain a first-order approximation.

The Hough transform is a feature extraction technique used in digital image processing. The classical transform identifies lines in the image, but it has been extended to identifying positions of arbitrary shapes that can be represented by a set of parameters, such as circles. In order to determine that two points lie on the same potential circle, it is necessary to create a representation of a circle that allows meaningful comparison in this context. In the standard Hough transform, each circle is represented by three parameters, which represent the center coordinates (in 2D) and radius from the center to the circle in question. It is well known that an infinite number of circles can be centered about a single point of the plane. If that point has coordinates $(x_0, y_0)$ in the image plane, all the lines that go through it obey to the following equation:

$$(x_0-a)^2+(y_0-b)^2=r^2,$$

where a and b are the coordinates of the center of the circle and r is the radius. This corresponds to a surface in the (a,b,r) plane, which is unique to that point. If the surfaces corresponding to two points are superimposed, the location (in the Hough space) where they cross correspond to surfaces (in the original image space) which pass through both points. More generally, a set of points which form a circle will produce surfaces which cross at the parameters for that surface.

The transform itself is quantized into an arbitrary number of bins, each representing an approximate definition of a possible circle. Each salient point in the edge-detected image is said to vote for a set of bins corresponding to the circles that pass through it. By simply incrementing the value stored in each bin for every feature lying on that circle, an array is built up which shows which circles fit most closely to the data in the image. By finding the bins with the highest value, the most likely circles can be extracted, and their (approximate) geometric definitions read off.

For the case of the endocardium and epicardium, one starts with an initial circle, which is defined based on the available information. The radius is computed from the result of the previous frame, or if it is the first frame it is computed according to position of a bottom left myocardium boundary. The parameters of the circle are allowed to vary around the initial circle, and the edges are used to vote for the best circle of fitting. This provides a rough size and center of the left ventricle.

Figure 2:
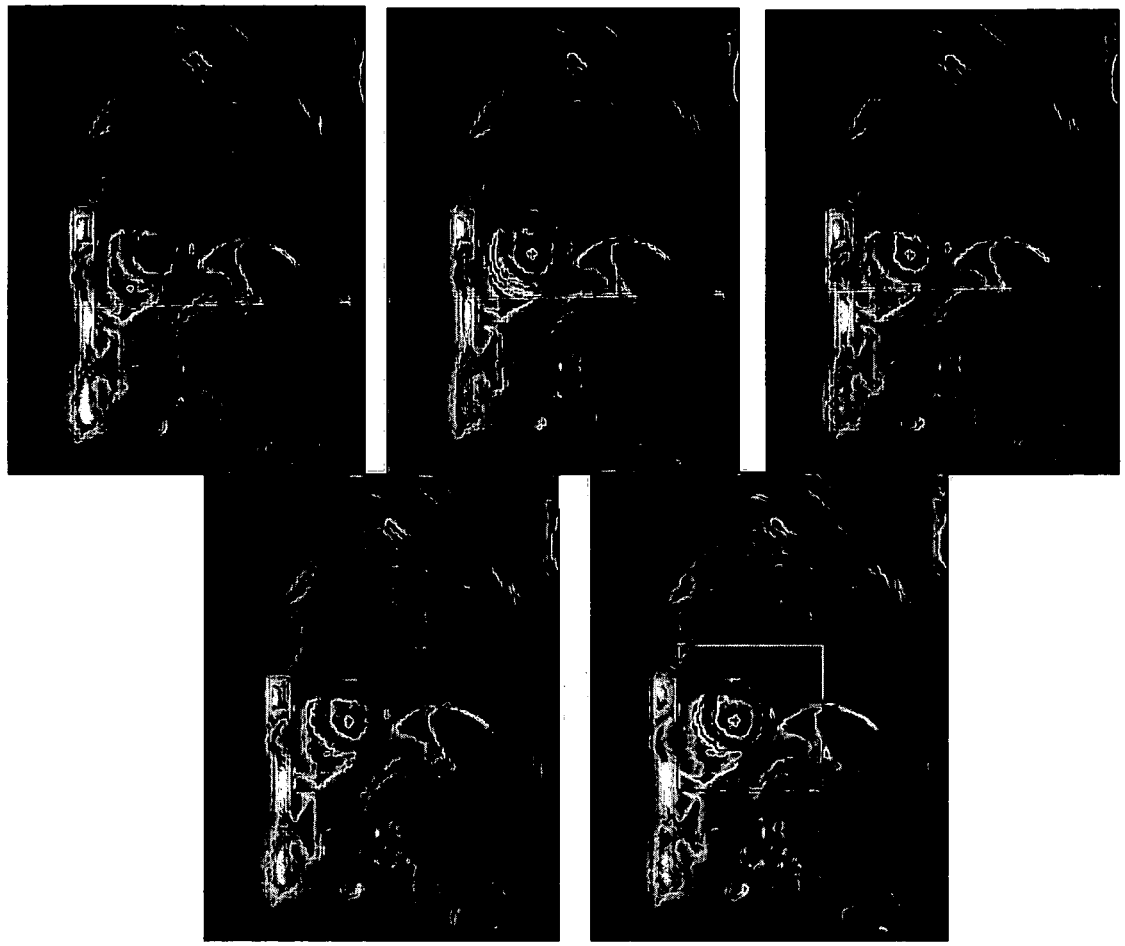
FIGS. 2(a)-(e) depicts phases of the myocardium segmentation, according to an embodiment of the invention.

FIG. 2(a) depicts the searched area for the Hough transform, as indicated by the box, and FIG. 2(b) depicts the initial startup circles, with the centerpoint indicated by a cross.

Referring again to FIG. 4, a next step 44 is searching for the endocardium points. Starting from the center of the above circle, rays are extended to all points on the circle. Along each ray, the strongest 1D edge is sought. The search range is limited to the vicinity of the result from the previous frame if available. The search result is a list of candidate boundary points of the endocardium, but not every point is valid. The actual boundary points will be chosen from this list.

Connected component analysis is applied to the candidate points to group them into parts. Afterwards, the most certain part is assigned to initialize the endocardium. The neighboring parts are then selected one by one.

At step 45, a method according to an embodiment of the invention searches for the epicardium points. The epicardium has more complex intensity variations in its neighborhood than the endocardium. Therefore, a search of the epicardium is similar to the epicardium, but with the following adaptions. First, the edge points are only detected in the left part of the epicardium, since for the other parts, the boundaries have low contrast between foreground and background. Second, the previous epicardium and the current endocardium are used as a guide, with the current epicardium being assumed to be between the two of them. Endocardium candidate points are depicted in FIG. 4(c) by the dashed curve about the center point, while the FIG. 4(d) depicts the endocardium segment in black and the epicardium candidate points as a dashed curve about the endocardium.

There are many places in the two boundaries, especially in the epicardium, where boundary points are missing or not connected. Therefore, referring to FIG. 4, a next step 46 of the algorithm is to interpolate between the two adjacent boundary points. The endocardium and epicardium can have complex shapes, and an exemplary interpolation functions for the boundaries makes use of splines.

Complex curves that cannot be represented by simple analytical functions can be represented by piecewise parametric polynomials joined together at certain points referred to as joints. Continuity and smoothness of parametric curves at the joints is controlled by parameterization on both sides of the joints. As one needs to estimate tangents, normals and curvatures, a parameterization which enables easy differentiation is desirable. For this reason, low-degree polynomials, typically linear, quadratic, or cubic, are very convenient.

A spline is a piecewise polynomial function that can be defined as $S:[a,b] \to R$ where S includes polynomial pieces $P_i:[r_i, r_{i+1}] \to R$, where $$a = r_0 < r_1 < \ldots < r_{k-2} < r_{k-1} = b.$$

That is, $$S(r) = P_0(r), r_0 \leq r < r_1,$$

$$S(r) = P_1(r), r_1 \leq r < r_2,$$

.

.

.

$$S(r) = P_{k-2}(r), r_{k-2} \leq r < r_{k-1}.$$

The given k points $r_i$ are known as knots. The vector $r = (r_0, \ldots, r_{k-1})$ is known as a knot vector for the spline. If the knots are equidistantly distributed in the interval [a,b] the spline is said to be uniform, otherwise it is said to be non-uniform. If the polynomial pieces on the subintervals $$[r_i, r_{i+1}], i = 0, \ldots, k-2$$

all have degree at most n, then the spline is said to be of degree $\leq n$ (or of order $n+1$). If $S \in C^{q_i}$ in a neighborhood of $r_i$, then any two pieces $P_{i-1}$ and $P_i$ share common derivative values from the derivative of order 0 (the function value) up through the derivative of order $q_i$. A parametric curve on the interval [a,b]

$$G(r) = \langle X(r), Y(r) \rangle, r \in [a,b]$$

is a spline curve if both X and Y are splines of the same degree with the same knot vectors on that interval.

An exemplary polynomial spline is the Ferguson parametric cubic curve: Given the two control points $r_0$ and $r_1$, and the slopes of the tangents $r'_0$ and $r'_1$ at each point, a parametric cubic curve can be defined that passes through $r_0$ and $r_1$, with the respective slopes $r'_0$ and $r'_1$ defined by equating the coefficients of the polynomial function $$r = r(u) = a_0 + a_1 u + a_2 u^2 + a_3 u^3,$$

with the values above. Namely $$r(0) = a_0$$

$$r(1) = a_0 + a_0 + a_2 + a_3$$

$$r'(0) = a_1$$

$$r'(1) = a_1 + 2a_2 + 3a_3$$

Solving these equations simultaneously for $a_0$, $a_1$, $a_2$ and $a_3$, one obtains $$a_0 = r(0),$$

$$a_1 = r'(0),$$

$$a_2 = 3[r(1) - r(0)] - 2r'(0) - r'(1),$$

and $$a_3 = 2[r(0) - r(1)] + r'(0) + r'(1).$$

Substituting these into the original polynomial equation and simplifying to isolate the terms with $r(0)$, $r(1)$, $r'(0)$, $r'(1)$, one has $$r = r(u) = (1 - 3u^2 + 2u^3)r(0) + (3u^2 - 2u^3)r(1) + (u - 2u^2 + u^3)r'(0) + (-u^2 + u^3)r'(1)$$

which is in cubic polynomial form. Alternatively, this can be written in the following matrix form $$r(u) = \begin{bmatrix} 1 & u & u^2 & u^3 \end{bmatrix} \begin{bmatrix} 1 & 0 & 0 & 0 \\ 0 & 0 & 1 & 0 \\ -3 & 3 & -2 & -1 \\ 2 & -2 & 1 & 1 \end{bmatrix} \begin{bmatrix} r(0) \\ r(1) \\ r'(0) \\ r'(1) \end{bmatrix}.$$

Another exemplary spline is known as the Bézier curve, which, for a set of n+1 control points $r_0, r_1, \ldots, r_n$, is defined by $$C(t) = \sum_{i=0}^{n} r_i B_{i,n}(t)$$

where $B_{i,n}(t)$ is a Bernstein polynomial and $t \in [0,1]$. The Bernstein polynomials defined by $$B_{i,n}(t) = \binom{n}{i} t^i (1-t)^{n-1},$$

where $$\binom{n}{i}$$

is a binomial coefficient. The Bernstein polynomials of degree n form a basis for the power polynomials of degree n.

As an example, a cubic Bézier curve can be defined by four points $r_0, r_1, r_2, r_3$ in the plane or in three-dimensional space. The curve starts at $r_0$ in the direction of $r_1$ and arrives at $r_3$ coming from the direction of $r_2$. In general, a Bézier curve will not pass through $r_1$ or $r_2$ (or any intermediate points); these points are only there to provide directional information. The distance between $r_0$ and $r_1$ determines "how long" the curve moves into direction $r_1$ before turning towards $r_3$. The Bézier curve always passes through the first and last control points and lies within the convex hull of the control points. The curve is tangent to $r_1 - r_0$ and $r_n - r_{n-1}$ at the endpoints. The "variation diminishing property" of these curves is that no line can have more intersections with a Bézier curve than with the curve obtained by joining consecutive points with straight line segments.

Bézier curves are useful in computer graphics because affine maps (such as moving, scaling and rotating) on a Bézier curve can be performed simply by applying the respective operation to the control points and then drawing the Bézier curve corresponding to the transformed points, perhaps with more or fewer interpolated segments depending on the scale factor, and because the meaning of the intermediate points is easily understood. However, Bézier curves are numerically unstable for large numbers of control points, and moving a single control point changes the global shape of the curve. The instability issue can be avoided by smoothly patching, together low-order Bézier curves.

According to an embodiment of the invention, the endocardium boundary segments are connected by Bezier curves, which is determined based on three disconnected points. According to another embodiment of the invention, the epicardium boundary segments are connected by both Bezier curves and Ferguson curves. Curve vectors are tangent to the epicardium segment. FIG. 4(e) depicts the final segmentation result of a method according to an embodiment of the invention, showing the endocardium and epicardium. The endocardium segment is shown in black with the endocardium as the jagged inner curve that serves as the segment boundary, while the epicardium is the outer curve.

Figure 3:
FIG. 3 depicts the segmentation results in 3 selected frames in a sequence, according to an embodiment of the invention.

FIG. 3 depicts further segmentation results of the endocardium and epicardium in three selected frames of a real-time cardiac MR sequence. The speed of the algorithm is close to real-time, in that an embodiment running on a Pentium™ IV 1.9 GHz processor takes under 100 ms to process 1 frame.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
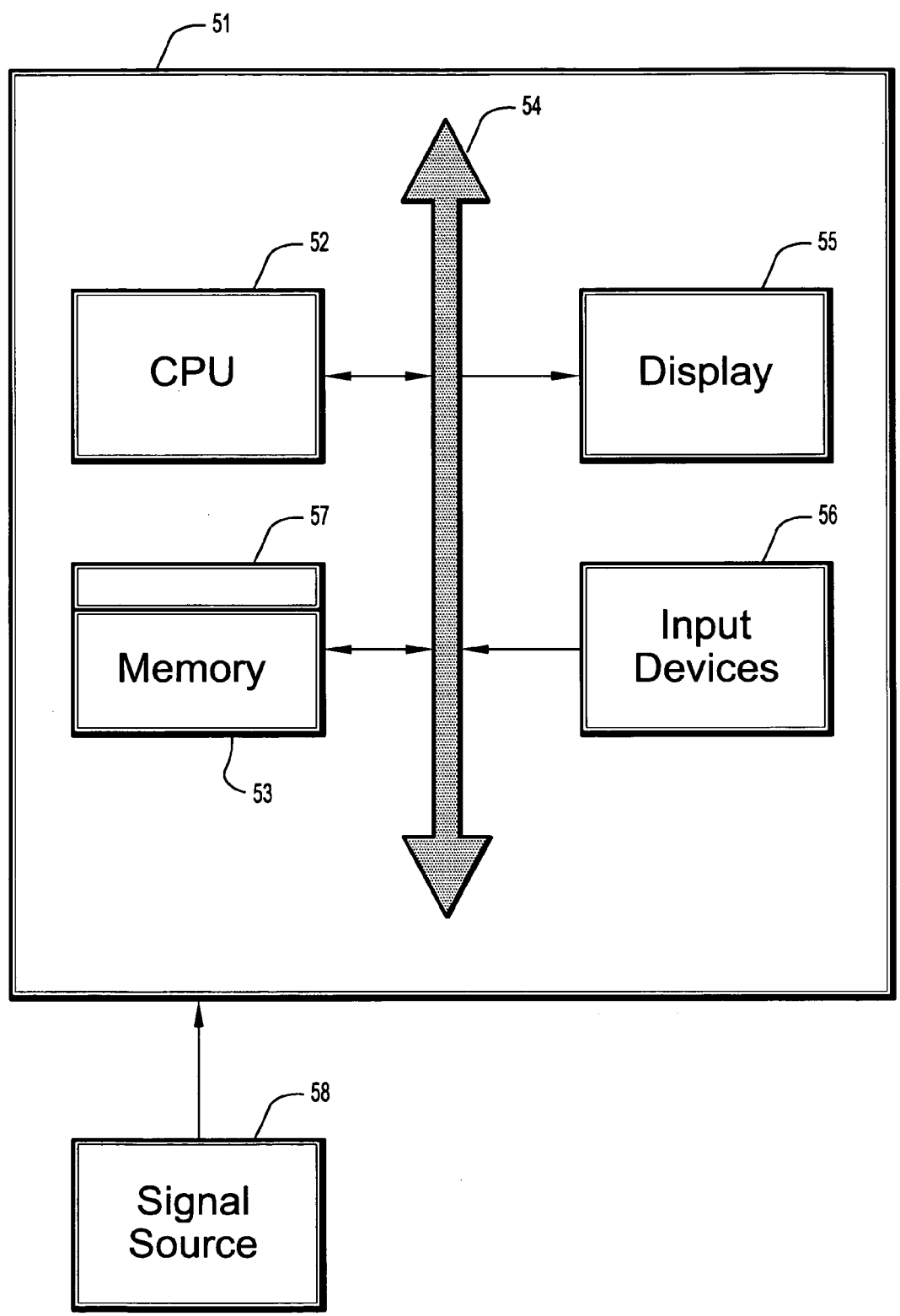
FIG. 5 is a block diagram of an exemplary computer system for implementing a method for real-time myocardial segmentation, according to an embodiment of the invention.

FIG. 5 is a block diagram of an exemplary computer system for implementing a real-time myocardial segmentation method according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for cardiac segmentation, comprising the steps of:

providing a plurality of digitized medical images, each said image comprising a plurality of intensities corresponding to a domain of points on an 2-dimensional grid, said plurality of images comprising a sequence of cardiac images acquired at different time points;

for each image, selecting a set of candidate points for the inner and outer boundaries of the myocardium and connecting points in said inner boundary and connecting points in said outer boundary with piecewise continuous polynomial functions, wherein selecting a set of candidate points for the inner and outer boundaries of the myocardium further comprises, for each boundary, detecting a set of edge points; initializing a circle whose radius is computed either from a result of a preceding image, or for a first image according to a position of a bottom left myocardium boundary, varying circle parameters around said initial circle, and using said edge points to vote for a best circle of fitting; and segmenting said myocardium in each image from a region of points between said boundaries, wherein said steps of providing a plurality of digitized medical images, selecting a set of candidate points, connecting points in said inner and outer boundaries, and segmenting said myocardium in each image are performed by a computer processor.

2. The method of claim 1, further comprising filtering noise from each said image with a low pass filter.

3. The method of claim 1, further comprising, for the inner myocardium boundary, extending a plurality of rays from a center of said circle to points on said circle, selecting those points near said circle that are edge points as candidate points, and grouping said candidate points using a connected component analysis.

4. The method of claim 3, wherein a search range for selecting candidate points in one of said sequence of images is limited to a region of inner myocardium boundary candidate points in a preceding image of said sequence of images.

5. The method of claim 1, further comprising, for the outer myocardium boundary, extending a plurality of rays from a center of said circle to points on said circle, selecting those points near said circle that are edge points in a left part of the outer myocardium boundary as candidate points, and grouping said candidate points using a connected component analysis.

6. The method of claim 5, wherein a search range for selecting candidate points in one of said sequence of images is limited to a region of inner myocardium boundary candidate points in the same image of said sequence of images, and outer myocardium boundary candidate points in a preceding image of said sequence of images.

7. A program storage device readable by a computer, tangibly embodying a program of instructions executable by the computer to perform the method steps for cardiac segmentation, said method comprising the steps of:

provide a plurality of digitized medical images, each said image comprising a plurality of intensities corresponding to a domain of points on an 2-dimensional grid, said plurality of images comprising a sequence of cardiac images acquired at different time points;

for each image, selecting a set of candidate points for the inner and outer boundaries of the myocardium and connecting points in said inner boundary and connecting points in said outer boundary with piecewise continuous polynomial functions, selecting a set of candidate points for the inner and outer boundaries of the myocardium further comprises, for each boundary, detecting a set of edge points; initializing a circle whose radius is computed either from a result of a preceding image, or for a first image according to a position of a bottom left myocardium boundary, varying circle parameters around said initial circle, and using said edge points to vote for a best circle of fitting; and segmenting said myocardium in each image from a region of points between said boundaries.

8. The computer readable program storage device of claim 7, the method further comprising filtering noise from each said image with a low pass filter.

9. The computer readable program storage device of claim 7, the method further comprising, for the inner myocardium boundary, extending a plurality of rays from a center of said circle to points on said circle, selecting those points near said circle that are edge points as candidate points, and grouping said candidate points using a connected component analysis.

10. The computer readable program storage device of claim 9, wherein a search range for selecting candidate points in one of said sequence of images is limited to a region of inner myocardium boundary candidate points in a preceding image of said sequence of images.

11. The computer readable program storage device of claim 7, the method further comprising, for the outer myocardium boundary, extending a plurality of rays from a center of said circle to points on said circle, selecting those points near said circle that are edge points in a left part of the outer myocardium boundary as candidate points, and grouping said candidate points using a connected component analysis.

12. The computer readable program storage device of claim 11, wherein a search range for selecting candidate points in one of said sequence of images is limited to a region of inner myocardium boundary candidate points in the same image of said sequence of images, and outer myocardium boundary candidate points in a preceding image of said sequence of images.

* * * * *